United States Patent Office 3,440,347
Patented Apr. 22, 1969

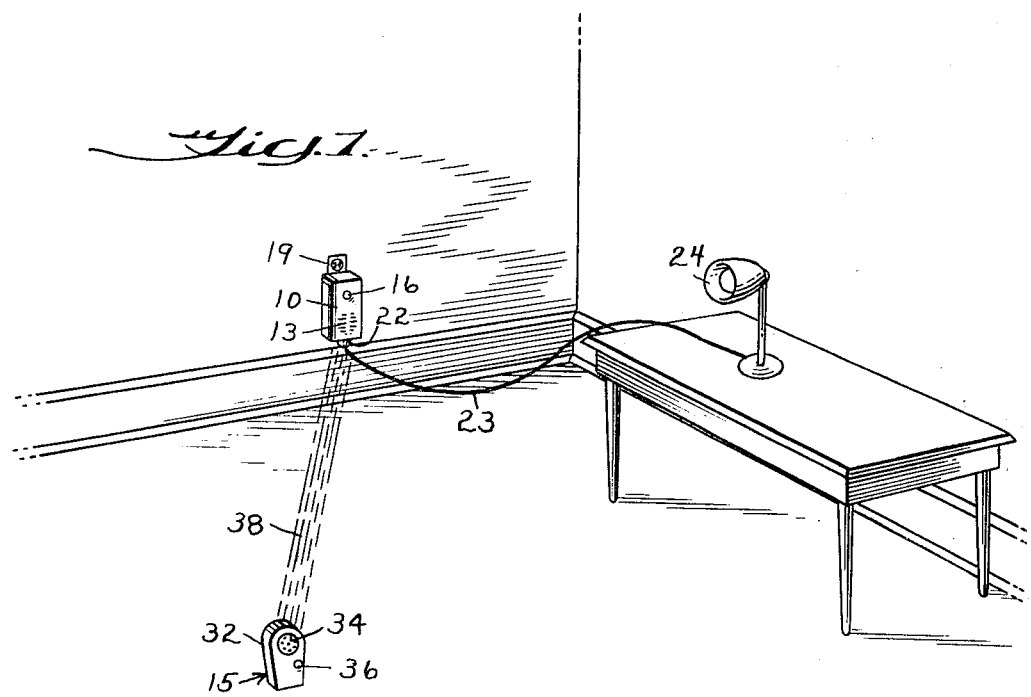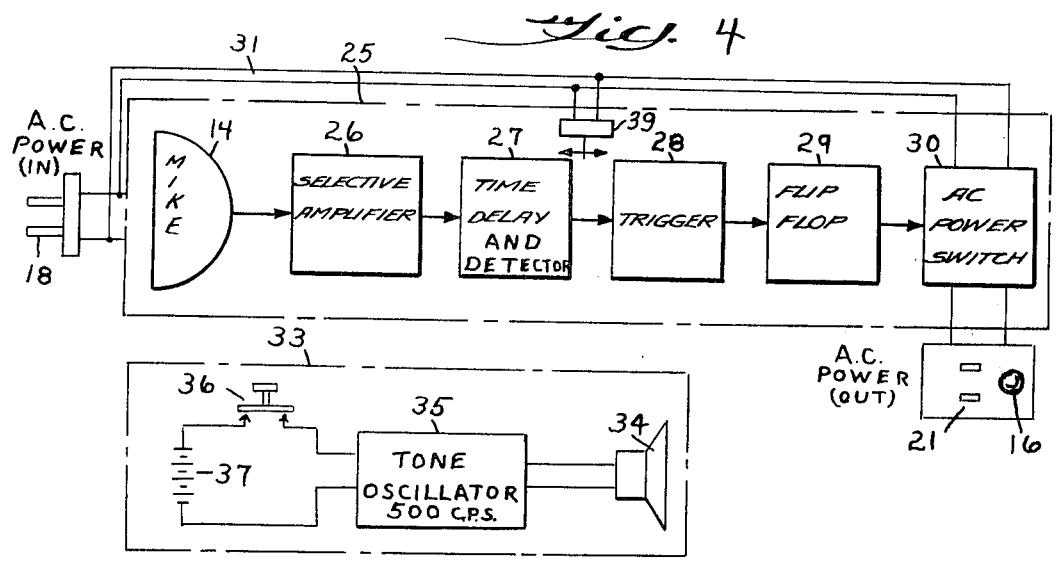

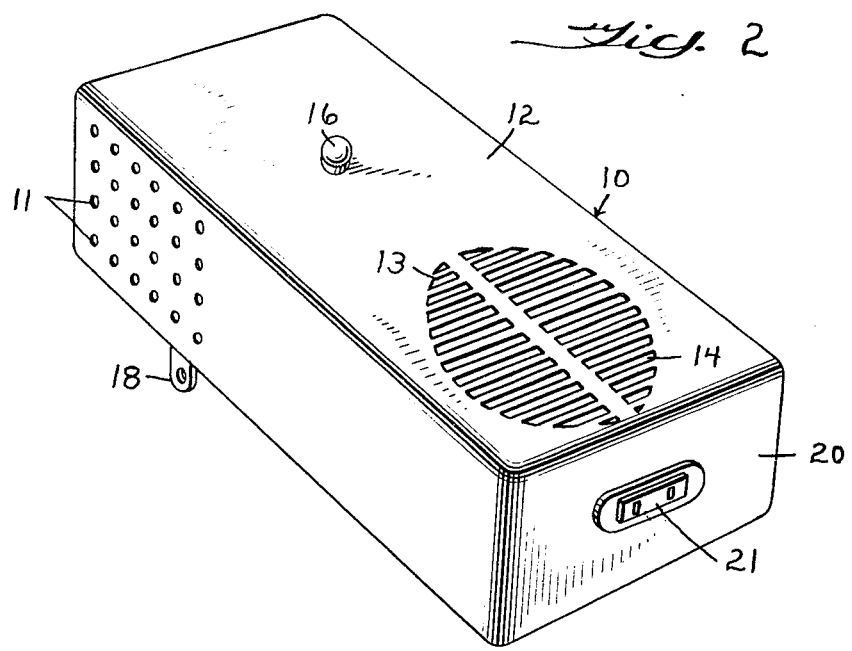
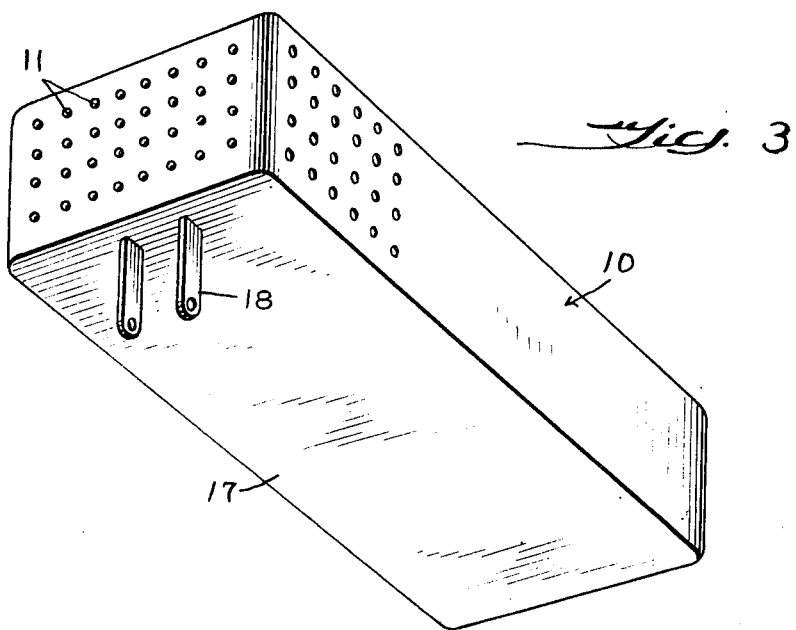

3,440,347
REMOTE CONTROL PLUG-IN UNIT
Joel V. Spencer, Adelphi, and Robert K. Kopsidas, Silver Spring, Md., assignors to Spenko International Inc., Adelphi, Md., a corporation of Maryland
Filed Feb. 2, 1966, Ser. No. 524,400
Int. Cl. H04m 1/00, 1/72; H02b 1/24
U.S. Cl. 179—1                                                3 Claims

ABSTRACT OF THE DISCLOSURE

A power control unit for household use to control the on-off operations of electrical apparatus within the household such as appliances, lamps, etc., comprises a portable hand carried transmitter unit which transmits a control signal of a particular frequency to a receiver unit located within a casing adapted to be plugged into a standard wall outlet. In response to a reception of the signal from the transmitter, the receiver functions to turn on or off a switch controlling the electrical apparatus which is also plugged into a socket on the casing and which receives its power from the wall outlet by way of the switch.

---

This invention relates to a plug-in type control unit which can be remotely actuated on command to apply power to, or remove power from, any electrical apparatus which is electrically connected to its output receptacle. The control unit is designed to be operable on 50 c.p.s. or 60 c.p.s., 100 to 130 volt AC commercial power sources since most electrical apparatus one would desire to control in this manner, e.g. lamps, radio, coffeemaker, television, etc.) operate from these types of commercial power sources. This would not be construed to mean that the control unit is limited in its use to these particular power sources alone as the control unit can easily be made to operate from other power sources.

The novelty of this invention, however, is related to its small size, portability, and particularly to its capability of being inserted into any standard two-terminal wall outlet in the home, office, etc. without the use of a power cord and remain intact against the wall outlet during operation. The control unit can also be used with any type of electrical extension cord which is terminated in the correct mating receptacle and thus can be placed at any convenient location dependent mainly upon the length of the extension cord and the location of the power outlet to be used.

Another feature of this invention is that it can easily be moved from any outlet in the home, office, etc. to any other outlet where it is desired to control another piece of electrical apparatus remotely, simply by removing the unit from the first outlet and inserting it into the second outlet.

A further feature of this invention is that by inserting a standard multiple outlet connector into the control unit, any number of electrical apparatus can be simultaneously controlled by remote operation. The only limit upon the number of electrical apparatus that can be controlled simultaneously by this unit is that the total power to be controlled in this manner must not exceed the maximum power handling rating of the control unit itself.

A further feature of this invention is that any one of the non-physically connected remote control systems can be employed in the control link. As an example of this point, a radio frequency, sonic, supersonic, or light transmission and reception system can easily be used.

A further feature of this invention is that it provides an indication of whether power has, or has not, been applied to the electrical apparatus which is being controlled. This is done in the particular control unit discussed herein by a visual indicator located on the front face of the unit. When power is applied to the electrical apparatus being controlled, the indicator is lighted; when power is not applied, the indicator is not lighted. This is useful when used with electrical equipments which are not provided with front panel indicators themselves (e.g. a television or radio set). The type of indicator discussed herein is visual but could just as easily be sonic, etc.

The invention will become better understood by the following detailed description of one suitable embodiment thereof and from the accompanying drawings wherein:

FIG. 1 is a view in perspective of a wall portion of a typical room wherein the novel remote control unit is shown as being plugged into a standard wall receptacle and controlling on-off operation of an electrical apparatus in the form of a table lamp;

FIGS. 2 and 3 are front and rear perspective views respectively of the plug-in remote control unit itself drawn to a much larger scale;

FIG. 4 is a block schematic showing the receiver circuit within the control unit; and FIG. 5 is a similar block schematic showing the transmitter circuit within the hand-carried transmitter unit.

With reference now to the drawings, and to FIGS. 2 and 3 in particular, the plug-in control or receiver unit is seen to be comprised of a casing 10 within which all necessary components of this unit are contained. One or more walls of the casing are provided with a series of small ventilation holes 11 for the purpose of permitting the escape of heat produced within the casing during operation. Located on the front wall 12 of the casing is a generally rounded slot pattern 13 behind which is mounted a microphone element 14 which is adapted to receive a "command" signal transmitted by the remotely positioned transmitter unit 15 shown in FIG. 1. Also located on the casing front wall 12 is an indicator lamp 16 which when lit provides an indication that power is being applied to the electrical apparatus desired to be controlled.

The indicator lamp 16, while not essential to the invention, is particularly useful in situations where the electrical apparatus involved is not itself provided with an indicator lamp or equivalent to tell when the apparatus is turned on.

Mounted in the rear wall 17 of casing 10 are the two male prongs 18 of the plug-in element itself which are adapted to be inserted into the wall outlet receptacle 19 of the room, as shown in FIG. 1. Located in the bottom end wall 20 of casing 10 is the female power output receptacle 21 which is adapted to receive the male plug 22 at one end of the electrical cord 23 leading to the electrical apparatus to be controlled, in this case illustrated as a table lamp 24. However, it is obvious that lamp 24 is only typical of such apparatus and hence it is also possible to use the invention to remotely control radios, television sets, etc.

The plug-in control unit within casing 10 according to the invention incorporates a receiver circuit 25 which is shown in block schematic form in FIG. 4. This circuit includes the previously mentioned pick-up microphone 14 connected to a frequency selective amplifier unit 26 which serves to amplify the output from microphone 14. The output of amplifier 26 is passed through a detector and time delay unit 27 and thence to a trigger unit 28 which serves to control a memory device in the form of a flipflop unit 29 which in turn controls the on-off operations of a power switch 30 interposed in a power lead-through circuit 31 between the male prongs 18 and the power output receptacle 21 on casing 10.

The pick-up element in the receiver, i.e. the microphone 14 is of conventional construction such as a high impedance crystal or capacitance type. The frequency selective amplifier unit 26 can also be any standard type and is preferably transistorized in view of the natural desire to keep the overall size of casing 10 to comparatively small dimensions, preferably not more than about 4″ in length, 2″ wide and about 1″ in depth. The amplifier should have sufficient gain to amplify the low level signals applied to its input by microphone 14. Normally the gain required for this purpose is of the order of from 1500 to 8000, depending upon the output level of microphone 14 and the "command" transmitter unit 15. Amplifier 26 is made frequency selective by use of a conventional band-reject filter in a negative feedback loop between output and input of the amplifier. This technique is well known in active filter design and hence the circuit details of the transistor stages in the amplifier and the negative feedback circuit have not been illustrated.

The combined detector and time delay unit 27 is also per se of conventional construction and hence a detailed disclosure of its circuit is not believed to be essential to an understanding of the invention. For example, the detector part can be any resistance, capacitance, diode or other network which detects the peak amplitude of the output of amplifier unit 26. The D.C. voltage output of the detector is used to control the time-delay which can be any network that will initiate charging of a current-storing device such as a capacitor at a prescribed rate when a suitable D.C. voltage is applied to its input. It must continue to charge as long as the prescribed D.C. voltage is present at its input. However, if the D.C. voltage is interrupted or ceases, the current storage device must then discharge immediately to a zero-storage state. The output of the time delay is represented by the increase or decrease of voltage across the current storage device. This voltage is then applied to the trigger unit 28.

Trigger unit 28 is also essentially of standard construction and any suitable level detecting trigger circuit may be used to perform the triggering function in this unit. All that is required is that when some predetermined level of voltage is reached at its input, from time delay unit 27, the trigger will switch voltage states at its output. This change of voltage state is then applied to the memory, flipflop unit 29.

Flipflop unit 29 can be of any standard two-state storage device. Its function is to switch from one state to another when a pulse from trigger unit 28 is applied to its input and to remain in this state until it receives another trigger pulse at which time it again switches states. The output of flipflop unit 29 is used for control of the on-off operations of the A.C. power switch 30 which functions to make, or break a power lead-through circuit 31, within casing 10, between the male plug-in prongs 18 and the female power outlet receptacle 21.

The power switch 30 can be of the solenoid type with a suitable set of contacts which are open or closed dependent upon whether the solenoid is energized, or de-energized, or in the alternative it can be of the so-called solid state type such as, for example, any of the well known controlled rectifier or transistor switching circuits used to block, or pass commercial power line voltage and current.

In addition to the foregoing described components within the receiver 25, there is also included a conventional power supply 39 within casing 10 which receives its energy supply from the wall outlet receptacle via the plug-in prongs 18 and puts out the required D.C. voltage and current for operating the various electronic receiver circuit components 26 to 30.

The A.C. power switch 30 in the plug-in control unit is adapted to be tripped to its "power-on" and "power-off" positions upon command from the transmitter unit 15 which, as indicated in FIG. 1, is small enough to be carried around by hand, thus to control the on-off operations of the electrical apparatus 24.

The command transmitter unit 15 includes a casing 32 housing a circuit 33 which includes a small, output speaker 34 from which emanates the actuating signal for the plug-in control unit. If amplifier unit 26 in receiver 25 is designed to accept and amplify a signal having a frequency of 500 c.p.s., then speaker 34 in the command transmitter unit 15 is supplied with a tone signal of this same frequency from the output of a simple, battery operated, fixed frequency oscillator 35, of conventional construction. The particular type of oscillator used for this purpose can be any one of the well known constructions used in present day audio equipment, provided that its frequency and the tone output from speaker 34 are fixed and more or less independent of normal ambient temperature excursions and battery voltage. The completely self-contained transmitter unit is provided with an on-off push-button switch 36 which when depressed applies power from a small 9 volt battery 37 within casing 32 to oscillator 35 and thus causes an audible tone of 500 cycle frequency to be emitted from speaker 34, which travels by sound wave link 38 to pick-up microphone 14 in the receiver circuit of the plug-in control unit.

Microphone 14 will of course pick up all audio frequencies which are passed on to the selective amplifier unit 26. However, since the amplifier is so designed as to reject all unwanted frequency signals, only the 500 cycle tone signal emitted from the command transmitter unit will be put through amplifier 26 to the detector and time delay unit 27. It is of course possible for spurious "noise" signals to also be present in the room where the remote control plug-in unit is located and which include signal components also having a 500 cycle frequency. To prevent these from interfering with proper operation of the apparatus, they are integrated out in the time delay circuit. Because noise is generally random in nature, the length of time that any particular noise frequency exists is short. With this knowledge, it is of course possible to eliminate the noise from the system by adjusting the time delay and trigger so that only signals of a given time delay will act to actuate the power switch 30 on and off. This is accomplished, for example, by transmitting the tone signal of 500 cycles from the command transmitter unit 15 by keeping the switch 26 closed for a minimum of approximately ¾ second without interruption.

With the presence of the desired signal frequency of 500 cycle sustained for a period of ¾ second, or longer, the detector and time delay unit 27 in the receiver 25 actuate the trigger 28 which in turn causes the memory flipflop 29 to change state and thus change the state of the power switch 30, for example from "off" to "on" thus turning on the electrical apparatus 24. The latter can be turned off by transmitting another sustained signal from the command transmitter unit 15.

If the electrical apparatus 24 has its own "on-off" switch, which would usually be the case, this switch is of course turned to the "on" position and left in that position so that the desired "on-off" control can be effected automatically by means of the "on-off" operations of the remotely controlled plug-in unit 10 in accordance with the invention.

In conclusion, while one embodiment of the inventive concept has been disclosed and illustrated, it is evident that this particular construction may be departed from in various respects without, however, departing from the spirit and scope of the invention as defined in the appended claims. Thus, while the illustrated embodiment employs a "sonic" type of signal link between the command transmitter and the remotely located plugged-in receiver, it is of course possible to modify the construction of both transmitter and receiver for other types of signals. Thus one may use for purposes of "command," a signal in the supersonic frequency range, or a radio signal, or a light signal. In all of these, the same advantages of the invention can be realized, namely in providing a comparatively small sized plug-in unit for turning electrical apparatus of various types on and off, and which can be controlled from remote locations by means of a small, hand carried command transmitter.

We claim:

1. A power control unit adapted to be actuated on command from a remotely positioned command transmitter thereby to control the on-off operations of electrical apparatus as desired, said power control unit comprising in combination a casing, said casing having a pair of spaced male power input terminals projecting from one wall thereof for electrically plugging said unit into a standard wall outlet receptacle in a room where the electrical apparatus to be controlled is located, a pair of spaced female terminals located in another wall of said casing and which serve as a power output receptacle to supply power to said electrical apparatus, a receiver circuit located within said casing, said receiver circuit including a pick-up unit mounted within said casing and responsive to a signal transmitted to it from the remotely located command transmitter, amplifier means having its input connected to the output from said pick-up unit for amplifying the received signal, and a power output switch controlled by the output from said amplifier means and which is actuated selectively from off-to-on position and vice versa by receipt of consecutive signals at said pick-up unit, said power output switch being interposed in the circuit connections extending between said male power input terminals and said female power output terminals.

2. A power control unit as defined in claim 1 wherein said power input male terminals are located on the rear wall of said casing, said female power output terminals and receptacles are located on the bottom end wall of said casing, and said signal pick-up unit is located on the front wall of said casing.

3. A power control unit as defined in claim 1 wherein the control signal is a sonic signal of a predetermined frequency, said signal pick-up unit is constituted by a microphone mounted at the inner side of a front wall of said casing, said amplifier means produces an output only for input signals of said predetermined frequency, and said amplifier means is followed in said receiver circuit by a detector and time delay unit, a trigger and flipflop in succession, said flipflop serving to actuate said power output switch from its on to off position and vice versa.

References Cited

UNITED STATES PATENTS

| 1,794,935 | 3/1931 | Washington et al. | 325—392 |
| 2,484,092 | 10/1949 | Hopgood. | |
| 2,817,025 | 12/1957 | Adler | 307—117 X |
| 3,214,640 | 10/1965 | Mills | 307—117 X |
| 3,270,216 | 8/1966 | Dersch. | |
| 3,286,031 | 11/1966 | Geddes. | |

KATHLEEN H. CLAFFY, *Primary Examiner.*

VAN C. WILKS, *Assistant Examiner.*

U.S. Cl. X.R.

307—117; 325—392; 339—147